Patented Dec. 19, 1933

1,940,315

UNITED STATES PATENT OFFICE 1,940,315

RUBBER ARTICLE

Edward E. McKay, Providence, R. I., assignor to Revere Rubber Company, Providence, R. I., a corporation of Rhode Island No Drawing. Application December 4, 1929
Serial No. 411,701

5 Claims. (Cl. 91—68)

This invention relates to rubber articles having a lustre finish and a process of making such articles.

Heretofore to produce a lustre finish on rubber articles it has been common to dip the rubber article into an ordinary transparent rubber cement containing colored aluminum powder thereby effecting the deposition on the surface of the rubber article of a thin layer of rubber containing colored aluminum. This process is objectionable in that the dipping operation involves the application of an excess amount of cement which contains a large amount of solvent thereby tending to cause the rubber to curl, and if the article be a thin one, a reduction in the strength of the wall of the article by solution of the rubber in the solvent. In addition the colors obtainable by such a process are limited to the possible colors of colored aluminum powder. Furthermore the process results in an article having a lustre which is impaired by the presence of color in the aluminum. Also, the process is limited in its usefulness to articles of such size and proportions as can be handled economically in dipping operations.

It is the object of this invention to provide a novel method of applying a colored lustre finish to the surface of rubber articles in which the variety of colors are substantially unlimited, in which the lustre of aluminum powder is not impaired by the color, in which several shades of color may be applied to the same article, and which is easy and economical of execution. It is also the object of this invention to provide a rubber article having a surface finish which may be of the same or different colors than that of the base material and which has a high lustre. It is also an object of this invention to provide an article having a surface finish in a variety of tints.

Other objects and advantages of this invention will appear in the following detailed description.

For the purpose of this invention the rubber article to which the surface color is to be applied may be made in the usual manner as by molding the article from sheet rubber goods as in the case of water bottles and bathing caps or by dipping a form into a rubber cement or into latex as in the case of rubber gloves or in any other manner appropriate to the article. The rubber stock of which the article is made may be either white in color or the natural color of uncompounded rubber or any of the varieties of colored rubbers at present known. The article may bear any surface design formed in the rubber which may be desired. The rubber stock forming the base material of the article may be either in the vulcanized or unvulcanized state at the time of the application of the surface material thereto.

To the surface of the article is applied a mixture which comprises aluminum powder in finely divided form which preferably is uncolored, although it may be colored if desired, and a solution of rubber in an organic solvent. The rubber solution preferred is prepared by first depolymerizing the rubber either by milling the rubber excessively or by heating the rubber at high temperatures with the solvent. By thus treating the rubber it is depolymerized so that a large quantity of the rubber dissolves in the solvent as compared to the proportion of rubber and solvent in ordinary rubber cements. Such a solution of depolymerized rubber is of low viscosity so that it is adapted to spraying operations and at the same time it contains sufficient rubber to embed the aluminum powder in the layer of rubber laid down from the solution. Tests have proven that ordinary rubber cement cannot be used practically for effecting the purposes of this invention. To such a solution of depolymerized rubber in organic solvent is added a coloring material such as eosin lake. Other suitable coloring matter may be employed according to the color desired in the finished article.

Such a concentrated solution of depolymerized rubber and a coloring matter in organic solvent is known as a rubber ink.

The aluminum powder and the rubber ink are mixed in various proportions according to the lustre on the finished article desired. Suitable proportions of the ingredients are as follows:

Blue ink_____20 fluid ounces
Aluminum powder_____1 ounce avoirdupois
Solvent_____16 fluid ounces.

Another formula is as follows:

Red ink_____12 fluid ounces
Aluminum powder_____1 ounce avoirdupois
Solvent_____20 fluid ounces Still another formula is as follows:

Green ink_____14 fluid ounces
Aluminum powder_____1 ounce avoirdupois
Solvent_____16 fluid ounces The solvent is any of the naphtha solvents and is added to give the mixture the proper fluidity.

The aluminum and rubber ink are kept in intimate mixture by continual stirring or shaking which may be effected as an additional operation or as an operation incidental to the manner in which the mixture is applied to the surface of the article.

The preferred way of applying the mixture to the article is by spraying under air pressure using the ordinary type of spray gun. With such a method the aluminum powder and rubber ink are maintained intimately mixed by the manipulations involved in spraying. An alternative way of applying the mixture to the surface of the rubber article is by dipping the rubber article into the mixture. In such case additional means must be provided for maintaining the aluminum powder and rubber ink intimately mixed. If desirable, the mixture may be brushed onto the surface of the article.

The article, if it be in the unvulcanized state when the mixture is applied to the surface thereof, is then vulcanized in the ordinary manner. If the article is in the vulcanized state when the mixture is applied to the surface thereof the article may be finished by merely drying the surface layer of the mixture or in addition the surface layer of the mixture may be treated with sulphur chloride or bromine to remove surface tack. The rubber ink may or may not contain vulcanizing agents as desired.

The article resulting from the operations above described has a surface color of any suitable tint which may be chosen from any of a very large variety of tints and which has a high lustre due to the presence of the uncolored aluminum powder. The surface layer may be of the same or different color than the base stock as desired. While in the preferred form of the invention uncolored aluminum powder is employed inasmuch as it results in an unimpaired lustre in the finished article, colored aluminum powder may be used if desired in order to give further coloring effects.

If two or more tints are desired on the finished article, the above process may be modified as follows: After spraying the first mixture of aluminum powder and rubber ink on to the surface of the article and before that layer or coat of mixture dries, some of the mixture is removed from various parts of the article. Then a second coat or layer of a differently colored mixture is applied over the surface of the article which results in a surface layer having different tints or shades of color at the various portions of the surface of the article as determined by the places in which the first layer or coat of mixture was removed.

The above process may be applied to any of a large variety of rubber articles such as bathing caps, toys, hot water bottles, bathing shoes, golf balls, gloves, aprons, bibs, playing balls, raincoats, overshoes, etc.

While certain preferred forms of the invention have been described by way of illustration, it is not intended so to limit the invention for variations in the details thereof may be made without departing from the scope of the invention as defined in the following claims.

Having thus described my invention, what I claim and desire to protect by Letters Patent is:

1. Process of treating rubber articles to produce a lustre finish which comprises coating the surface of the article with a mixture of low viscosity colored rubber ink and aluminum powder, and finishing the article.

2. The process of treating rubber articles to produce a colored lustre finish which comprises coating the surface of the article with a mixture of low viscosity colored rubber ink and an aluminum powder, removing parts of the coating, applying a second coat of a mixture of differently colored rubber ink and aluminum powder, and finishing the article.

3. The process of treating rubber articles to produce a lustre finish which comprises spraying a mixture of low viscosity colored rubber ink and uncolored aluminum powder on to the surface of the article, and treating the surface of the article with sulphur chloride.

4. The process of treating rubber articles to produce a colored lustre finish which comprises spraying the surface of the article with a mixture of low viscosity colored rubber ink and uncolored aluminum powder, removing parts of the mixture from the surface of the article, spraying a second mixture of differently colored rubber ink and uncolored aluminum powder on to the surface of the article, and treating the surface of the article with sulphur chloride.

5. The process of treating rubber articles to produce a colored lustre finish which comprises spraying the surface of the article with a mixture of low viscosity colored rubber ink and uncolored aluminum powder, removing parts of the mixture from the surface of the article, spraying a second mixture of differently colored rubber ink and uncolored aluminum powder on to the surface of the article, and finishing the article.

EDWARD E. McKAY.